United States Patent
Chailloux et al.

(10) Patent No.: US 10,519,325 B2
(45) Date of Patent: Dec. 31, 2019

(54) WATERBORNE COATING COMPOSITION

(71) Applicant: Dow Global Technologies LLC, Midland, MI (US)

(72) Inventors: Loïc Chailloux, Cagnes sur mer (FR); John Haigh, Roquefort les Pins (FR); Debora Ressnig, Zurich (CH); Daniel Duc, Grassie (FR); Xavier Bricout, Voisins le Btx (FR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/114,715

(22) Filed: Aug. 28, 2018

(65) Prior Publication Data

US 2019/0077973 A1    Mar. 14, 2019

(30) Foreign Application Priority Data

Sep. 13, 2017  (EP) ..................... 17290117

(51) Int. Cl.
| | |
|---|---|
| *C09D 5/16* | (2006.01) |
| *C09D 185/02* | (2006.01) |
| *C08J 3/02* | (2006.01) |
| *C08K 7/02* | (2006.01) |
| *C04B 28/06* | (2006.01) |

(52) U.S. Cl.
CPC ............ *C09D 5/1637* (2013.01); *C04B 28/06* (2013.01); *C08J 3/02* (2013.01); *C08K 7/02* (2013.01); *C09D 185/02* (2013.01); *C08J 2443/02* (2013.01)

(58) Field of Classification Search
CPC .. C09D 5/1637; C09D 185/02; C09D 143/02; C09D 4/00; C09D 7/61; C04B 28/06; C04B 28/065; C04B 2111/00482; C04B 2103/0065; C08K 7/02; C08J 3/02; C08J 2443/02

See application file for complete search history.

(56) References Cited

U.S. PATENT DOCUMENTS

| 4,325,856 A | 4/1982 | Ishikawa et al. |
|---|---|---|
| 4,384,056 A | 5/1983 | Schmidt et al. |
| 4,539,361 A | 9/1985 | Siol et al. |
| 4,654,397 A | 3/1987 | Mueller-Mall et al. |
| 4,733,005 A | 3/1988 | Schmidt et al. |
| 4,814,373 A | 3/1989 | Frankel et al. |
| 5,162,415 A | 11/1992 | Rehmer et al. |
| 5,824,734 A | 10/1998 | Yang |
| 6,492,451 B1 | 12/2002 | Dersch et al. |
| 6,818,697 B2 * | 11/2004 | Zhang .................. C08F 265/04 523/201 |
| 2005/0222299 A1 | 10/2005 | Garzon et al. |
| 2008/0146724 A1 * | 6/2008 | Bohling ................ C08F 2/22 524/500 |
| 2012/0269963 A1 | 10/2012 | Neugebauer et al. |
| 2014/0343194 A1 | 11/2014 | Taquet et al. |
| 2014/0366779 A1 | 12/2014 | Schoon et al. |

FOREIGN PATENT DOCUMENTS

| EP | 0256144 A2 | 2/1988 |
|---|---|---|
| EP | 2431341 A1 | 3/2012 |
| GB | 558904 | 1/1944 |
| JP | H08120192 A | 5/1996 |
| WO | 9925780 | 5/1999 |
| WO | 2017067951 A1 | 4/2017 |
| WO | 2017093703 A1 | 6/2017 |

OTHER PUBLICATIONS

European Search Report for EP Application No. EP17290117, dated Mar. 6, 2018; 7 pages.

* cited by examiner

*Primary Examiner* — Robert S Jones
(74) *Attorney, Agent, or Firm* — Karl E. Stauss; Cantor Colburn LLP

(57) ABSTRACT

A waterborne coating composition including: an aqueous emulsion polymer having a copolymerized Phosphorous-acid monomer, an aqueous dispersion of cement, and a solid inert filler, each in certain amounts, is provided. A method for providing a coated substrate employing the waterborne coating composition that has been subsequently activated and the coated substrate so formed are also provided.

9 Claims, No Drawings

WATERBORNE COATING COMPOSITION

This invention relates to a waterborne coating composition. In particular the invention relates to a waterborne coating composition including an emulsion polymer, a cement dispersion and a filler. More particularly, the invention relates to a waterborne coating composition including: (a) an aqueous emulsion polymer, the emulsion polymer including, as copolymerized units, from 0.1% to 10% Phosphorous-acid monomer, the emulsion polymer in an amount of from 10% to 30% by weight on a dry basis; (b) an aqueous dispersion of cement, the aqueous dispersion having a cement solids content of from 50% to 80% by weight, said cement selected from the group consisting of aluminous cement, sulfoaluminous cement, and mixtures thereof, said cement in an amount of from 10% to 30% by weight on a dry basis; and (c) solid inert filler in an amount of 40% to 82% by weight on a dry basis; wherein the emulsion polymer/cement ratio is from 0.66 to 1.5 on a dry/dry basis; and wherein the water/cement ratio is from 0.6 to 2.0 on a dry cement basis. The invention further relates to a method for providing a coated substrate and a substrate so formed.

Coatings for substrates in many fields of endeavor are advantageously aqueous based coatings for emissions legislation, safety, and environmental reasons; further in some applications such as, for example, decorative coatings, road marking coatings, exterior insulating coatings, and roofing coatings, high solids aqueous coatings are of advantage particularly as they are a foundation for high build coatings that can achieve lower VOC levels and dry more readily.

U.S. Pat. No. 5,824,734 discloses an improved fast drying coating composition particularly adapted for use as traffic paint. This waterborne coating includes an aqueous emulsion containing an acrylic film-forming polymer, a stabilizing system for the emulsion that is pH sensitive, and mineral pigment. However, improvement in access to higher solids content and faster drying time of such coating systems is still sought.

US Patent Application Publication No. 2014/0343194 A1 discloses stabilized aqueous suspension including aluminous cement and/or calcium sulfoaluminous cement and binding compositions including the aqueous composition in combination with certain organic binders. However, most emulsion polymers are unstable in the presence of such aqueous cementitious suspensions. The problem faced by the inventors is the provision of a waterborne coating system to provide a fast hardening or setting, quick-setting, waterborne high build coating relative to prior aqueous emulsion polymer-based coatings; and further to provide stable cementitious compositions including certain emulsion polymers, coatings formed therefrom having other surprising property advantages.

In a first aspect of the present invention there is provided a waterborne coating composition comprising: (a) an aqueous emulsion polymer, said emulsion polymer comprising, as copolymerized units from 0.1% to 10% Phosphorous-acid monomer, based on the dry weight of said emulsion polymer; said emulsion polymer in an amount of from 8% to 30% by weight on a dry basis; (b) an aqueous dispersion of cement, said aqueous dispersion having a cement solids content of from 50% to 80% by weight, said cement selected from the group consisting of aluminous cement, sulfoaluminous cement, and mixtures thereof, said cement in an amount of from 10% to 30% by weight on a dry basis; and (c) solid inert filler in an amount of from 40% to 82% by weight on a dry basis; wherein said emulsion polymer/cement ratio is from 0.66 to 1.5 on a dry/dry basis; and wherein the water/said cement ratio is from 0.6 to 2.0 on a dry cement basis.

In a second aspect of the present invention there is provided a method for providing a coated substrate comprising: (a) providing a solid substrate surface; (b) applying thereon an activated waterborne composition comprising (i) a waterborne coating composition comprising (aa) an aqueous emulsion polymer, said emulsion polymer comprising, as copolymerized units from 0.1% to 10% Phosphorous-acid monomer, based on the dry weight of said emulsion polymer; said emulsion polymer in an amount of from 8% to 30% by weight on a dry basis; (bb) an aqueous dispersion of cement, said aqueous dispersion having a cement solids content of from 50% to 80% by weight, said cement selected from the group consisting of aluminous cement, sulfoaluminous cement, and mixtures thereof, said cement in an amount of from 10% to 30% by weight on a dry basis; and (cc) solid inert filler in an amount of from 40% to 82% by weight on a dry basis; wherein said emulsion polymer/said cement ratio is from 0.66 to 1.5 on a dry/dry basis; and wherein water/said cement ratio is from 0.6 to 2.0 on a dry cement basis; wherein the pH of said waterborne coating composition has been adjusted to a pH>11; and (ii) an aqueous activator solution comprising from 0.4% to 0.8% of a metal salt selected from the group consisting of sodium, potassium, magnesium and calcium salts, by weight of metal based on dry weight of said cement; and (d) drying said activated waterborne coating composition.

In a third aspect of the present invention there is provided a coated substrate formed by the method of the second aspect of the present invention.

The waterborne coating composition of the present invention includes an aqueous emulsion polymer the emulsion polymer including, as copolymerized units from 0.1% to 10%, preferably from 1% to 5%, Phosphorous-acid monomer, the emulsion polymer in an amount of from 8% to 30%, preferably from 10% to 17%, by weight on a dry basis. By "waterborne" and by "aqueous" herein is meant that the continuous phase of the waterborne coating composition and that of the aqueous emulsion polymer is composed of from 50% to 100%, by weight, water. Optionally water-miscible compounds may be present. By "emulsion polymer" is meant a polymer prepared by the free radical addition polymerization of ethylenically-unsaturated monomers in an aqueous emulsion polymerization process. "Phosphorous-acid monomers" herein include salts of those monomers, and mixtures thereof. Typical phosphorous-acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include $CH_2=C(R)-C(O)-O-(R1O)_n-P(O)(OH)_2$, where R=H or CH3 and R1=alkyl, such as SIPOMER™ PAM-100, SIPOMER™ PAM-200, SIPOMER™ PAM-300, and SIPOMER™ PAM-4000, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are Harcross T-Mulz 1228 and 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth)acrylate, 3-phospho-2-hydroxypropyl (meth)acrylate, SIPOMER™ PAM-100, and SIPOMER™ PAM-200.

In addition to the Phosphorous-acid monomer the emulsion polymer of the present invention includes at least one nonionic copolymerized monoethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; and (meth)acrylonitrile. The use of the term "(meth)" followed by another term such as (meth)acrylate or (meth)acrylamide, as used throughout the disclosure, refers to both acrylates or acrylamides and methacrylates and methacrylamides, respectively.

In addition to the Phosphorous-acid monomer, the aqueous emulsion polymer may include as copolymerized units, carboxylic acid monomer in the amount of from 0% to 6%, preferably from 0% to 1%, more preferably a de minimus amount, of carboxylic acid monomer such as, for example, acrylic acid, methacrylic acid, crotonic acid, itaconic acid, fumaric acid, maleic acid, monomethyl itaconate, monomethyl fumarate, monobutyl fumarate, and maleic anhydride.

In certain embodiments the emulsion polymer includes from 0% to 5%, by weight; or in the alternative, from 0% to 1%, by weight; or from 0% to 0.2%, by weight; based on the weight of the emulsion polymer solids, of a copolymerized multi-ethylenically unsaturated monomer. In certain embodiments the emulsion polymer is free from copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The calculated glass transition temperature ("Tg") of the emulsion polymer is typically from −50° C. to 110° C., preferably from 0° C. to 70° C. Polymer Tgs are calculated herein by using the Fox equation (T. G. Fox, Bull. Am. Physics Soc., Volume 1, Issue No. 3, page 123 (1956)), that is, for calculating the Tg of a copolymer of monomers M1 and M2, $$1/Tg(calc.)=w(M1)/Tg(M1)+w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The waterborne emulsion polymer desirably has solids content greater than 50% on a weight basis.

The polymerization techniques used to prepare such waterborne emulsion-polymers are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

Neutralizers can be selected from mineral bases such as sodium hydroxide, potassium hydroxide, salts of phosphoric acid, organic amines such as, for example, alkyl hydroxylamine, and ammonia.

Formation of the emulsion polymer by a multistage process that facilitates various particle morphologies such as, for example, core-shell, core-partial shell, and multilobal is well-known in the art and is also contemplated in the present invention; in this case the Phosphorous-acid monomer level of the overall emulsion polymer is relevant to the claimed levels of copolymerized Phosphorous-acid monomer regardless of the various compositions that may exist within the particles.

The average particle diameter of the emulsion-polymerized polymer particles is typically from 30 to 500 nanometers, preferably from 80 to 300 nanometers. Processes yielding polymodal particle size distributions such as those disclosed in U.S. Pat. Nos. 4,384,056 and 4,539,361, for example, may alternatively be employed.

The waterborne coating composition of the present invention includes an aqueous dispersion of aluminous cement, sulfoaluminous cement, or mixtures thereof, in an amount of from 10% to 30%, preferably from 10% to 20%, by weight on a dry cement basis. The aqueous dispersion of cement has a cement solids content of from 50% to 80% by weight, based on the dry weight of cement. Such stable dispersions are described in US Patent Application Publication No. 2014/0343194 A1 and are represented herein by the product EXALT™ (Kerneos, SA) used in the waterborne coating compositions of the invention.

The waterborne coating composition of the present invention includes a solid inert filler in an amount of 40% to 82%, preferably from 63% to 82%, by weight on a dry basis. Typical solid inert fillers include, for example, inorganic particles such as silica, kaolin, silicates, iron oxide, calcium carbonate, barium sulfate, aluminum oxides, lithopone, mica, and the like; synthetic or natural fibers; organic particles such as polymer particles, for example, polystyrene and polyvinyl chloride beads, expandable polymeric microspheres, and microsphere pigments containing voids or vesicles. Examples of microsphere pigments that include polymer particles containing one or more voids include ROPAQUE™ opaque polymer and vesiculated polymer particles.

In the waterborne coating composition of the present invention the emulsion polymer/cement ratio is from 0.66 to 1.5, preferably from 0.7 to 1.25, on a dry/dry basis; and wherein water/said cement ratio is from 0.6 to 2.0 on a dry cement basis.

The waterborne coating composition is prepared by techniques that are well known in the coatings art. Typically the cement dispersion and the aqueous emulsion polymer are mixed before the addition of adjuvants such as, for example, one or more emulsion polymers not including copolymerized Phosphorous acid monomer in an amount of less that half of that of the emulsion polymer comprising, as copolymerized units from 0.1% to 10% Phosphorous-acid monomer on a solids basis and defoamer, and then the filler is added. The waterborne coating composition may include conventional coatings adjuvants such as, for example, emulsifiers; coalescents; plasticizers; antifreezes; curing agents; buffers; neutralizers; thickeners; rheology modifiers; humectants; wetting agents; biocides; antifoaming agents; UV absorbers; fluorescent brighteners; light or heat stabilizers; biocides; chelating agents; dispersants; colorants; waxes; water-repellents; "reflective beads" such as, for example, glass beads, quartz beads, and ceramic beads; absorbers such as, for example, ion exchange resins, molecular sieves and voided latex particles; and anti-oxidants.

In certain embodiments the waterborne coating composition of the invention has a VOC (volatile organic compound) level of less than 100 g/liter of coating, alternatively a VOC level of less than 50 g/liter.

The solids content of the waterborne coating composition may be from 50% to 80%, by volume. The viscosity of the waterborne coating composition may be from 50 centipoises ("cps") to 5000 cps, preferably of from 50 cps to 1000 cps as measured using a Brookfield viscometer; viscosities appropriate for different application methods vary considerably.

In the method of the present invention a solid substrate surface is provided. The solid substrate surface includes indoor and outdoor solid surfaces, including surfaces that are or may be exposed to pedestrians, moving vehicles, tractors, or aircraft continuously, constantly or intermittently. Some non-limiting examples are highways, streets, driveways, sidewalks, runways, taxiing areas, tarmac areas, parking lots, rooftops, glass mats, indoor floors (such as factory floors, floors inside shopping malls, etc.), walls, and playgrounds. The surface material may be masonry, tar, asphalt, resins, concrete, cement, stone, stucco, tiles, wood, glass, polymeric materials and combinations thereof. It is also within the scope of the invention to apply the coating over another one or more layers of fresh, aged, or weathered coating already applied on the surface, the pre-existing coating being derived from aqueous- or solvent-based paints, polymeric films, and thermoplastics, for example.

In the method of the present invention an activated waterborne coating composition including the waterborne coating composition of the invention and an activator solution is applied to the substrate surface. The aqueous activator solution includes from 0.4% to 0.8% of a metal salt selected from the group consisting of sodium, potassium, magnesium and calcium salts, by weight of metal based on dry weight of said cement; The activator solution is typically a basic (pH>7) solution of a lithium, potassium, sodium, magnesium, or calcium salt such as, for example, hydroxide, sulfate or carbonate. Preferred is a lithium salt at a level of from 0.4% to 0.8%, by weight of metal based on dry weight of said cement. A typical activator is PERAMIN™ AXL-80 ($Li_2SO_4.H_2O$). Typically, the pH of the waterborne coating composition is raised to pH=11, preferably to pH=13, more preferably to pH>13, and then the activator solution is added with mixing.

The activated waterborne coating composition may be applied to the solid substrate surface using conventional coatings application methods such as, for example, brush, roller, squeegee, mop, curtain coater, immersion, and spraying methods such as, for example, air-atomized spray, air-assisted spray, airless spray, high volume low pressure spray, and air-assisted airless spray. Drying of the waterborne coating composition is typically allowed to proceed under ambient conditions such as, for example, at from 5° C. to 35° C. or at elevated temperatures such as from greater than 35° C. to 150° C. The dry waterborne coating compositions are particularly suited for use as high build road marking or traffic paints and construction paints.

The following examples serve to illustrate the invention.

Test Methods:

Dry Abrasion Testing:

Dry abrasion tests were carried out on a Taber Industries 5131 abrader according to the following procedure: H22 wheels were used in combination with 500 g weights on each side. Three times 500 cycles were run per sample. Wheels were cleaned with water using soap and brush, resurfaced with 50 cycles using resurfacing disks S11 and dried in an oven before running the next cycle. Test samples were weighted before and after each cycle to track the material loss, several cycles have been run on the same sample and minimum three different test samples have been used. Statistical evaluation has been performed using the JMP software.

Drying/No Pick-Up Time Testing:

Drying tests were performed by adapting the procedure described in the ASTM standard D 711-89. The laboratory test permits comparing the no-pick-up time of coatings, particularly traffic paints. Films of 2 mm thickness were applied to a Leneta grading sheet. A steel cylinder equipped with two rubbery O-rings was rolled down from a ramp over the wet film at constant time intervals. The times were compared 1) when the paint left no mark on the O-rings and 2) when the wheel left no trace on the sample.

Waterborne Emulsion Polymers Used in Examples

| Waterborne emulsion polymer | % Acid monomer content, Based on wt. of dry polymer |
|---|---|
| A1 | 3.2 PEM |
| A2 | 3.2 PEM |
| A3 | 3.2 PEM |
| B1 | 2.0 AA |
| B2 | None |
| B3 | None |
| B4 | ACRONAL ™ S-790 (carboxylic acid) |

Note:
PEM is 2-Phosphoethyl methacrylate, 65% active: AA is acrylic acid; ACRONAL ™ is a trademark of BASF SE.

EXAMPLE 1. FORMATION OF WATERBORNE COATING COMPOSITION AND ACTIVATED WATERBORNE COATING COMPOSITION

Blending procedure: An aqueous emulsion polymer (at 51% solids) and an aqueous dispersion of cement were mixed before addition of an antifoam agent followed by sand fillers in the amounts presented in Table 1.1. The paint formulation was stable and may be stored for over a month. The activator solution was premixed according to the mass ratios in Table 1.1 and added while stirring. The activated waterborne coating composition was then applied to paper strips at a thickness of 2 mm and dried for seven days before Taber abrasion tests.

TABLE 1.1

Compositions of waterborne coating composition and activator solution

| Paint | |
|---|---|
| Emulsion polymer (51% solids) | 20.8% |
| EXALT ™ (60% solid) | 17.2% |
| SIBELCO ™ C 300 | 20.6% |
| SIFRACO ™ NE 03 | 41.3% |
| FOAMASTER ™ MO2134 | 0.1% |
| | 100% |
| Activator | |
| PERAMIN ™ AXL-80 | 0.70% |
| NaOH (50%) | 1.75% |
| $H_2O$ | 0.35% |

EXALT™ and PERAMIN™ are trademarks of Kerneos, SA; SIBELCO™ is a trademark of Sibelco N.V.; SIFRACO™ is a trademark of Sifraco, SA; FOAMASTER™ is a trademark of BASF SE.

EXAMPLE 2. EVALUATION OF MECHANICAL PROPERTIES

Mechanical properties related to durability performance were measured by abrasion results on coatings formed by the method of the present invention according to Example 1. Dried/hardened coatings were subjected to abrasion tests.

TABLE 2.1

Evaluation of abrasion resistance

| | Polymer type | Abrasion/g | ± |
|---|---|---|---|
| Control | solventborne | 1.39 | 0.13 |
| Example 2.A1 | waterborne | 0.08 | 0.03 |
| Example 2.A2 | waterborne | 0.15 | 0.03 |
| Comp. Ex. 2.B1 | waterborne | 0.27 | 0.03 |
| Comp. Ex. 2.B2 | waterborne | 0.29 | 0.04 |

The dry coated substrates of the invention Examples 2.A1 and 2.A2 incorporating aqueous emulsion polymers A1 and A2, respectively, exhibit a statistically significant advantage in abrasion resistance relative to that of the comparative examples including aqueous emulsion copolymers, B1 and B2 not including Phosphorous acid monomer.

EXAMPLE 3. EVALUATION OF COMPATIBILITY OF AQUEOUS EMULSION POLYMERS WITH ACTIVATOR SOLUTIONS

An EXALT™ compatible emulsion is desirably stable at pH>13 and at high ionic strength. The compatibility tests were performed as follows. For each emulsion the pH was raised above 13 using NaOH (50%). In a separate vial the accelerator salt (PERAMIN™ AXL-80; Li2SO4.H2O) was mixed with the aqueous emulsion polymer at a level of 7 wt % based on emulsion polymer solids.

The data in Table 3.1 presents the amount of salt that can be added before the emulsions flocculate.

TABLE 3.1

Robustness of different aqueous emulsion polymers against cement activation conditions of high ionic strength.

| Emulsion Polymer | B3 | B1 | A1 | A3 |
|---|---|---|---|---|
| Amount of $Li_2SO_4 \cdot H_2O$ (PERAMIN ™ AXL-80) added before flocculation wt %, (10 g emulsion) | 2.5% | 2.8% | 30% | 10% |

Aqueous emulsion polymers A1 and A3 including copolymerized Phosphorous-acid monomer exhibit a surprising advantageous stability under these activation conditions and, in particular resistance to high salt contents relative to that of the comparative aqueous emulsion polymers not including Phosphorous-acid monomer, B1 and B3.

EXAMPLE 4. FORMATION OF WATERBORNE COATING COMPOSITION AND ACTIVATED WATERBORNE COATING COMPOSITION SUITABLE FOR USE AS A TRAFFIC OR ROAD-MARKING PAINT

Waterborne coating compositions were prepared according to Table 4.1. To activate the waterborne coating compositions the activator solution was mixed manually with the coating composition shortly before applying the coating. All other manipulations were carried out as described in ASTM norm D 711-89.

TABLE 4.1

Composition of waterborne coating compositions and activator solution

| Example | Comp. 4.3 | Comp. 4.2 | 4.1 |
|---|---|---|---|
| (Compositions in g) | | | |
| Emulsion Polymer A1 | | | 112 |
| Emulsion Polymer B1 | 103 | 101 | |
| Emulsion Polymer B2 | 25 | — | 25 |
| EXALT ™ (wt % solids) | 133 (65) | 103 (60) | 124(70) |
| SIBELCO ™ C 300 | 108 | 111 | 108 |
| SIFRACO ™ NE03 | 184 | 226 | 184 |
| FOAMASTER ™ MO 2134 | 0.5 | 0.5 | 0.5 |
| Activator-Accelerator | | | |
| PERAMIN ™ AXL-80 | 6.1 | 4.3 | 6.1 |
| NaOH (50%) | 15.1 | 10.8 | 15.1 |
| Water | 3 | 2.2 | 3 |

EXAMPLE 5. EVALUATION OF DRYING PERFORMANCE OF ACTIVATED WATERBORNE COATING COMPOSITIONS

TABLE 5.1

Drying properties of activated waterborne compositions

| Waterborne Coating Composition | 4.1 | Comp.4.2 | Comp.4.3 |
|---|---|---|---|
| No Pick-up Time (50% rel. humidity): | | | |
| Film thickness (mm) | 2 | 2 | |
| No adherence to rubber rings (min) | 35-45 | 50 | |
| No marks on paint (min) | 60 | 50 | |
| No Pick-up Time (90% rel. humidity): | | | |
| Film thickness (mm) | 2 | 2 | 2 |
| No adherence to rubber rings (min) | 30 | >150 | 210 |
| No marks on paint (min) | 70 | >150 | >240 |

At 50% RH the activated waterborne coating composition (4.1) of the invention and the comparative composition (4.2) performed similarly. However, at 90% RH surprisingly the setting performance of the activated waterborne coating composition (4.1) was not notably affected by the humidity level. In comparison the setting times of the comparative compositions (4.2 and 4.3) were much longer at higher humidity.

EXAMPLE 6

Mechanical properties related to durability performance were measured by abrasion results on coatings formed by the method of the present invention according to Example 4. Dried/hardened coatings were subjected to Taber abrasion as per the Test Method abrasion tests.

TABLE 6.1

Evaluation of abrasion resistance

| | Polymer type | Composition | Abrasion/g |
|---|---|---|---|
| Control | solventborne | MMA | 1.59 |
| Example 6.1 | waterborne | A1/B2 75/25 | 0.45 |
| Comp. Ex. 6.2 | waterborne | B4 | 1.56 |

A dry coating of the invention (Ex. 6.1) exhibited strikingly superior Taber abrasion results when compared to a dry coating (comp. Ex. 6.2) based on a styrene/acrylic emulsion polymer not containing copolymerized Phosphorous acid monomer.

EXAMPLE 7. EVALUATION OF DRYING PERFORMANCE OF ACTIVATED WATERBORNE COATING COMPOSITIONS

TABLE 7.1

Drying time performance of coatings formed by the method of the present invention according to Example 4.

| Waterborne Coating Composition | 7.1 A1/B2, 75/25, wt. | Comp.7.2 B4 |
|---|---|---|
| No Pick-up Time (50% rel. humidity): | | |
| Film thickness (mm) | 2 | 2 |
| No marks on paint (min) | 65 | 170 |
| No Pick-up Time (90% rel, humidity): | | |
| Film thickness (mm) | 2 | 2 |
| No marks on paint (min) | 65 | >250 |

Surprisingly, the setting performance of the activated waterborne coating composition of the invention (7.1) was not notably affected by the humidity level. The setting time of the comparative composition (7.2) was much longer at 90% RH.

What is claimed is:

1. A waterborne coating composition comprising:
    (a) an aqueous emulsion polymer, said emulsion polymer comprising, as copolymerized units from 0.1% to 10% Phosphorous-acid monomer, based on the dry weight of said emulsion polymer; said emulsion polymer in an amount of from 8% to 30% by weight on a dry basis;
    (b) an aqueous dispersion of cement, said aqueous dispersion having a cement solids content of from 50% to 80% by weight, said cement selected from the group consisting of aluminous cement, sulfoaluminous cement, and mixtures thereof, said cement in an amount of from 10% to 30% by weight on a dry basis; and
    (c) solid inert filler in an amount of from 40% to 82% by weight on a dry basis; wherein said emulsion polymer/said cement ratio is from 0.66 to 1.5 on a dry/dry basis; and wherein the water/said cement ratio is from 0.6 to 2.0 on a dry cement basis.

2. The waterborne coating composition of claim 1 wherein said emulsion polymer comprises, as copolymerized units from 1% to 5% Phosphorous-acid monomer, based on the dry weight of said aqueous emulsion polymer.

3. The waterborne coating composition of claim 1 wherein said emulsion polymer is in an amount of from 10-17% by weight on a dry basis; wherein said aqueous dispersion of cement is in an amount of from 10% to 20% by weight on a dry basis; and wherein solid filler is in an amount of from 63% to 80% by weight on a dry basis.

4. The waterborne coating composition of claim 1 wherein said emulsion polymer/said cement ratio if from 0.7 to 1.25 on a dry/dry basis.

5. A method for providing a coated substrate comprising:
(a) providing a solid substrate surface;
(b) applying thereon an activated waterborne composition comprising (i) a waterborne coating composition comprising (aa) an aqueous emulsion polymer, said emulsion polymer comprising, as copolymerized units from 0.1% to 10% Phosphorous-acid monomer, based on the dry weight of said emulsion polymer; said emulsion polymer in an amount of from 8% to 30% by weight on a dry basis;
(bb) an aqueous dispersion of cement, said aqueous dispersion having a cement solids content of from 50% to 80% by weight, said cement selected from the group consisting of aluminous cement, sulfoaluminous cement, and mixtures thereof, said cement in an amount of from 10% to 30% by weight on a dry basis; and
(cc) solid inert filler in an amount of from 40% to 82% by weight on a dry basis; wherein said emulsion polymer/said cement ratio is from 0.66 to 1.5 on a dry/dry basis; and wherein water/said cement ratio is from 0.6 to 2.0 on a dry cement basis; wherein the pH of said waterborne coating composition has been adjusted to a pH>11; and (ii) an aqueous activator solution comprising from 0.4% to 0.8% of a metal salt selected from the group consisting of sodium, potassium, magnesium and calcium salts, by weight of metal based on dry weight of said cement; and
(d) drying said activated waterborne coating composition.

6. The method for providing a coated substrate of claim 5 wherein said emulsion polymer comprises, as copolymerized units from 1% to 5% Phosphorous-acid monomer, based on the dry weight of said aqueous emulsion polymer.

7. The method for providing a coated substrate of claim 5 wherein said emulsion polymer is in an amount of from 10% to 17% by weight on a dry basis; wherein said aqueous dispersion of cement is in an amount of from 10% to 20% by weight on a dry basis; and wherein solid filler is in an amount of from 63% to 80% by weight on a dry basis.

8. The method for providing a coated substrate of claim 5 wherein said emulsion polymer/said cement ratio is from 0.7 to 1.25 on a dry/dry basis.

9. A coated substrate formed by the method of claim 5.

* * * * *